(12) United States Patent
Ran et al.

(10) Patent No.: US 12,197,879 B2
(45) Date of Patent: Jan. 14, 2025

(54) TRANSLATION METHOD AND APPARATUS, ELECTRONIC DEVICE, AND COMPUTER-READABLE STORAGE MEDIUM

(71) Applicant: Tencent Technology (Shenzhen) Company Limited, Shenzhen (CN)

(72) Inventors: Qiu Ran, Shenzhen (CN); Yankai Lin, Shenzhen (CN); Peng Li, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 371 days.

(21) Appl. No.: 17/710,933

(22) Filed: Mar. 31, 2022

(65) Prior Publication Data

US 2022/0222447 A1    Jul. 14, 2022

Related U.S. Application Data

(63) Continuation of application No. PCT/CN2021/091997, filed on May 7, 2021.

(30) Foreign Application Priority Data

May 25, 2020   (CN) .......................... 202010450957.1

(51) Int. Cl.
*G06F 40/40*    (2020.01)
*G06F 40/205*    (2020.01)
(Continued)

(52) U.S. Cl.
CPC ............ *G06F 40/51* (2020.01); *G06F 40/205* (2020.01); *G06F 40/58* (2020.01)

(58) Field of Classification Search
CPC .......... G06F 40/40; G06F 40/42; G06F 40/44; G06F 40/45; G06F 40/47; G06F 40/51;
(Continued)

(56) References Cited

U.S. PATENT DOCUMENTS 6,161,083 A * 12/2000 Franz ................. G06F 40/211
704/7
8,914,277 B1 * 12/2014 Liu ................... G06F 40/211
707/711
(Continued)

FOREIGN PATENT DOCUMENTS

CN    101458681 A    6/2009
CN    102467498 A    5/2012
(Continued)

OTHER PUBLICATIONS

Tencent Technology, WO, PCT/CN2021/091997, Jul. 26, 2021, 6 pgs.
(Continued)

*Primary Examiner* — Qi Han
(74) *Attorney, Agent, or Firm* — Morgan, Lewis & Bockius LLP

(57) ABSTRACT

An electronic device obtains a to-be-translated sentence. The electronic device divides the to-be-translated sentence into a preset quantity of clauses. The electronic device separately translates each of the clauses to obtain a respective translation result corresponding to each of the clauses. The electronic device combines the respective translation results corresponding to each of the clauses according to semantics to obtain a target translation sentence corresponding to the to-be-translated sentence.

19 Claims, 5 Drawing Sheets

(51) Int. Cl.
  *G06F 40/51* (2020.01)
  *G06F 40/58* (2020.01)
(58) Field of Classification Search
  CPC ........ G06F 40/56; G06F 40/58; G06F 40/151; G06F 40/117; G06F 40/10; G06F 40/20; G06F 40/205
  USPC .......................... 704/2, 1, 4, 5, 8, 9, 10, 257
  See application file for complete search history.

(56) References Cited

U.S. PATENT DOCUMENTS

| | | | |
|---|---|---|---|
| 2004/0030542 A1 | 2/2004 | Fuji | |
| 2004/0098247 A1* | 5/2004 | Moore | G06F 40/44 704/4 |
| 2007/0203688 A1 | 8/2007 | Fuji et al. | |
| 2017/0031901 A1 | 2/2017 | Song et al. | |
| 2020/0201943 A1* | 6/2020 | Murakami | G06N 20/00 |

FOREIGN PATENT DOCUMENTS

| | | |
|---|---|---|
| CN | 104750687 A | 7/2015 |
| CN | 105320650 A | 2/2016 |
| CN | 105912533 A | 8/2016 |
| CN | 108153743 A | 6/2018 |
| CN | 108874791 A | 11/2018 |
| CN | 109408833 A | 3/2019 |
| CN | 110298045 A | 10/2019 |
| CN | 110334360 A | 10/2019 |
| CN | 110852117 A | 2/2020 |
| CN | 111611811 A | 9/2020 |
| JP | 2015069359 A | 4/2015 |

OTHER PUBLICATIONS

Tencent Technology, IPRP, PCT/CN2021/091997, Nov. 17, 2022, 7 pgs.
Tencent Technology, ISR, PCT/CN2021/091997, Jul. 26, 2021, 2 pgs.
Tencent Technology, Japanese Office Action, JP Patent Application No. 2022-539180, Sep. 5, 2023, 12 pgs.

* cited by examiner

| Translated sample sentence | there are lots of farmers doing this today |
|---|---|
| Translated sample sentence including repeated translated words | there are lots of farmers lots of DEL doing this today |

FIG. 3

TRANSLATION METHOD AND APPARATUS, ELECTRONIC DEVICE, AND COMPUTER-READABLE STORAGE MEDIUM

CROSS-REFERENCE TO RELATED APPLICATIONS

This application is a continuation application of PCT Patent Application No. PCT/CN2021/091997, entitled "TRANSLATION METHOD AND APPARATUS. AND ELECTRONIC DEVICE AND COMPUTER READABLE STORAGE MEDIUM" filed on May 25, 2020, which claims priority to Chinese Patent Application No. 202010450957.1, filed with the State Intellectual Property Office of the People's Republic of China on May 25, 2020, and entitled "TRANSLATION METHOD AND APPARATUS, ELECTRONIC DEVICE, AND COMPUTER-READABLE STORAGE MEDIUM", all of which are incorporated herein by reference in their entirety.

FIELD OF THE TECHNOLOGY

This application relates to the field of language translation processing technologies, and in particular, to a translation method and apparatus, an electronic device, and a computer-readable storage medium.

BACKGROUND OF THE DISCLOSURE

In conventional technologies, an autoregressive neural machine translation (NMT) technology is usually used for translating a to-be-translated sentence, that is, the to-be-translated sentence is translated word by word, leading to a slow translation speed.

SUMMARY

A main objective of embodiments of this application is to provide a translation method and apparatus, an electronic device, and a non-transitory computer-readable storage medium. According to solutions in the embodiments of this application, sentence translation quality can be improved, thus enhancing user experience.

According to an aspect, an embodiment of this application provides a translation method, executed by an electronic device, the method including:
  obtaining a to-be-translated sentence;
  dividing the to-be-translated sentence according to a preset (e.g., pre-determined, pre-defined) quantity, to obtain the preset quantity of clauses:
  separately translating each of the clauses to obtain respective translation results corresponding to each of the clauses, and
  combining the translation results corresponding to each of the clauses according to semantics, to obtain a target translation sentence corresponding to the to-be-translated sentence.

According to another aspect, this application provides a translation apparatus including:
  a to-be-translated sentence obtaining module, configured to obtain a to-be-translated sentence;
  a clause determining module, configured to divide the to-be-translated sentence according to a preset quantity, to obtain the preset quantity of clauses,
  a translation module, configured to separately translate the clauses to obtain respective translation results corresponding to the clauses; and
  a target translation sentence determining module, configured to combine (e.g., fuse) the translation results corresponding to the clauses according to semantics, to obtain a target translation sentence corresponding to the to-be-translated sentence.

According to another aspect, an embodiment of this application provides an electronic device, the electronic device including a processor and a memory; the memory storing computer-readable instructions, the computer-readable instructions, when loaded and executed by the processor, implementing the foregoing translation method.

According to another aspect, an embodiment of this application provides a non-transitory computer-readable storage medium, storing computer-readable instructions, the computer-readable instructions, when loaded and executed by the processor, implementing the foregoing translation method.

According to another aspect, an embodiment of this application provides a computer program product or computer program, the computer program product or the computer program including computer instructions, the computer instructions being stored in a computer-readable storage medium. A processor of a computer device reads the computer instructions from the computer-readable storage medium and executes the computer instructions to cause the computer device to perform the foregoing translation method.

BRIEF DESCRIPTION OF THE DRAWINGS

To describe the technical solutions in embodiments of this application more clearly, the following briefly describes the accompanying drawings required for describing the embodiments of this application.

FIG. 3 is a schematic diagram of a translated sample sentence including repeatedly translated words according to an embodiment of this application;

DESCRIPTION OF EMBODIMENTS

Figure 1A:
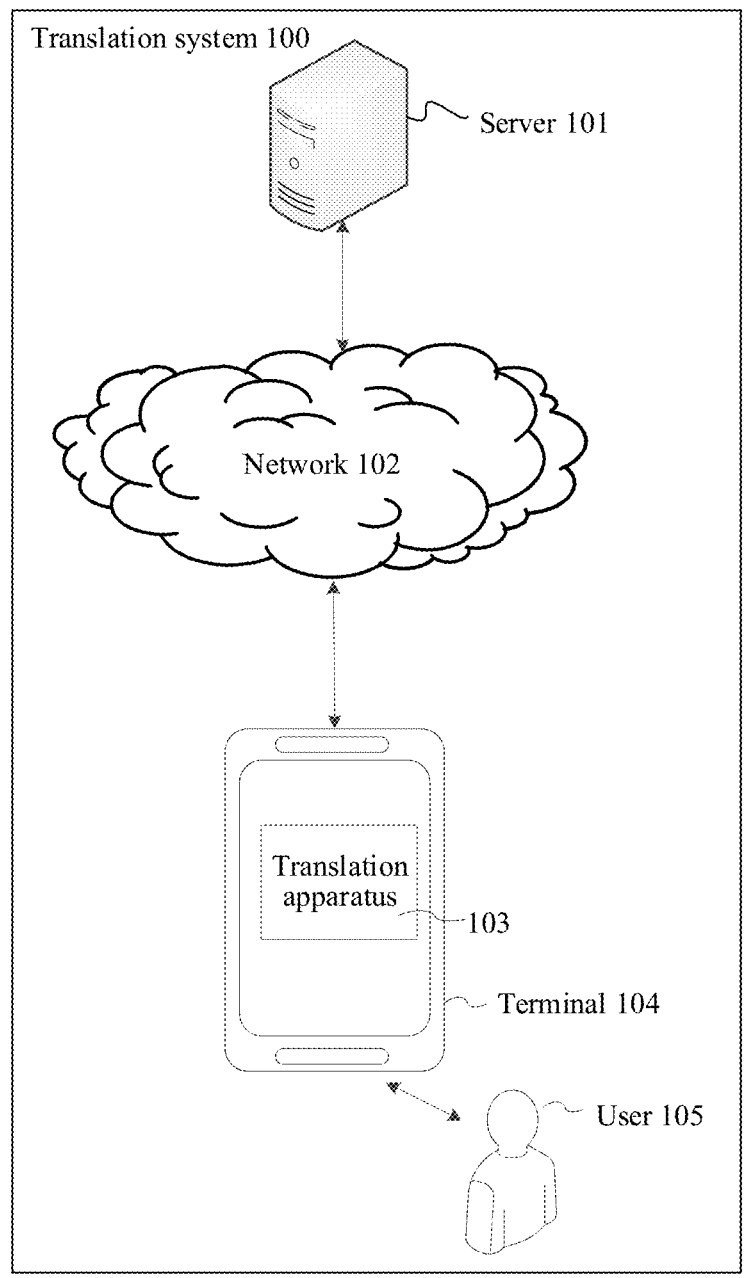
FIG. 1A is a schematic diagram of an exemplary system architecture to which a technical solution according to an embodiment of this application is applicable.

To make the invention objectives, features, and advantages of this application clearer and more comprehensible, the following clearly and completely describes the technical solutions in the embodiments of this application with reference to the accompanying drawings in the embodiments of this application. Apparently, the embodiments described are merely a part rather than all of the embodiments of this application. All other embodiments obtained by a person of ordinary skill in the art based on the embodiments of this application without creative efforts shall fall within the protection scope of this application.

The following describes embodiments of this application in detail. Examples of the embodiments are shown in the accompanying drawings. The same or similar elements and the elements having same or similar functions are denoted by like reference numerals throughout the descriptions. The embodiments that are described below with reference to the accompanying drawings are exemplary, and are only used to interpret this application and cannot be construed as a limitation to this application.

A person skilled in the art may understand that, the singular forms "a", "an", and "the" used herein may include the plural forms as well, unless the context clearly indicates otherwise. It is to be further understood that, the terms "include" and/or "comprise" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

Machine Learning (ML) is a multi-field interdisciplinary subject involving the probability theory, statistics, the approximation theory, convex analysis, the algorithm complexity theory, and the like. The ML specializes in studying how a computer simulates or implements a human learning behavior to obtain new knowledge or skills, and reorganize an existing knowledge structure, so as to keep improving its performance. The ML is the core of AI, is a basic way to make the computer intelligent, and is applied to various fields of AI. The ML and deep learning generally include technologies such as an artificial neural network, a belief network, reinforcement learning, transfer learning, inductive learning, and adversarial learning.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The following describes the technical solutions of this application and how to resolve the foregoing technical problems according to the technical solutions of this application in detail by using specific embodiments. The following several specific embodiments may be combined with each other, and the same or similar concepts or processes may not be described repeatedly in some embodiments. The following describes the embodiments of this application with reference to the accompanying drawings.

An execution entity of this application may be any electronic device, such as a server, a user terminal, or the like. The solutions of this application are applicable to an application scenario of machine translation, such as online translation, and especially applicable to an application scenario that has a requirement on translation speed. The solutions of this application can meet the users' requirement on translation speed.

FIG. 1A is a schematic diagram of an exemplary system architecture to which a technical solution according to an embodiment of this application is applicable. As shown in FIG. 1A, a translation system 100 includes: a server 101, a network 102, a terminal 104, and a user 105. A translation apparatus 103 is installed on the terminal 104. The user 105 starts the translation apparatus 103 and enters a to-be-translated sentence in the translation apparatus 103, and then the terminal 104 transmits the to-be-translated sentence to the server 101 for translation.

According to the method provided in the embodiments of this application, the server 101 executes the following operations: obtaining a to-be-translated sentence; dividing the to-be-translated sentence according to a preset (e.g., predefined) quantity, to obtain the preset quantity of clauses; separately translating each of the clauses to obtain respective translation results corresponding to the clauses; and fusing (e.g., combining) the translation results corresponding to the clauses so that semantics of each translated word correspond to semantics of a corresponding word in the to-be-translated sentence, to obtain a target translation sentence corresponding to the to-be-translated sentence. In some embodiments, the server 101 translates each of the clauses in parallel.

Then, the server 101 returns the target translation sentence to the terminal 104 to display to the user 105.

In this way, a plurality of clauses may be processed in parallel and translated simultaneously, and finally fused into a target translation sentence, thus increasing the translation speed.

Figure 1B:
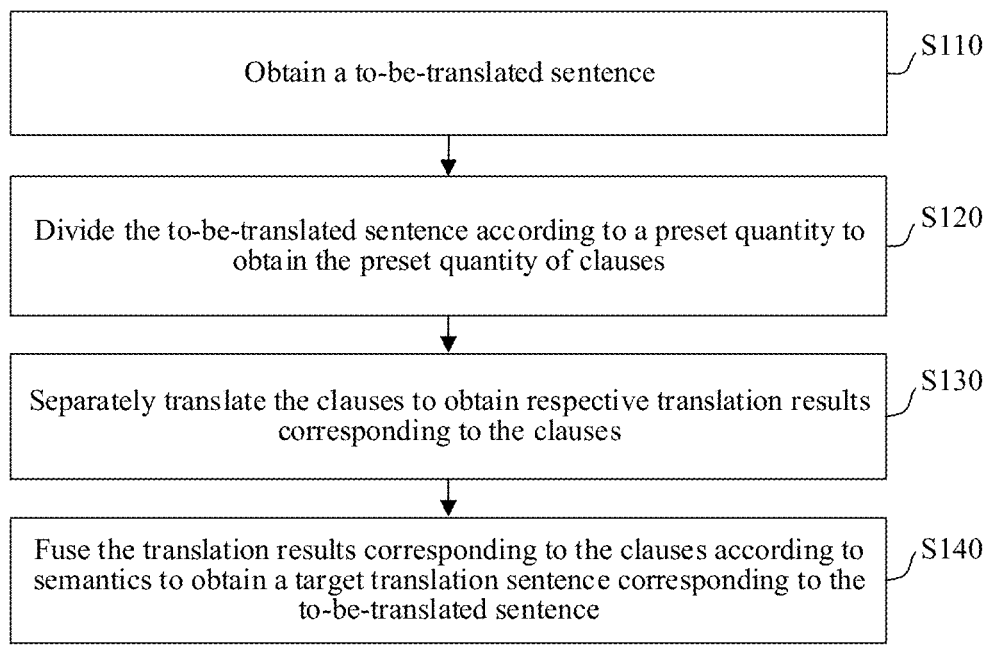
FIG. 1B is a schematic flowchart of a translation method according to an embodiment of this application.

FIG. 1B is a schematic flowchart of a translation method provided in the embodiments of this application. As shown in the figure, this application takes a server, for example, the server 101 shown in FIG. 1A, as an execution entity for description. The method may include step S110 to step S140:

Step S110: Obtain a to-be-translated sentence.

The to-be-translated sentence may be a sentence uploaded by a user to a translation platform, or may be a sentence selected from a specified database, and a specific source of the to-be-translated sentence is not limited in the embodiments of this application. The to-be-translated sentence may be in any language, such as Chinese or English, and the language of the to-be-translated sentence is not limited in the embodiments of this application.

The to-be-translated sentence may be words, a voice, or a text translated into a specified language from a voice. The to-be-translated sentence may alternatively be a sentence that has already been translated, and the specific expression form of the to-be-translated sentence is not limited in the embodiments of this application.

In practice, when the obtained to-be-translated information is a text document or a paragraph, the to-be-translated text document or the to-be-translated paragraph may be divided into sentences, and each sentence may be used as a to-be-translated sentence.

Step S120: Divide the to-be-translated sentence according to a preset quantity, to obtain the preset quantity of clauses.

Step S130. Separately translate the clauses to obtain respective translation results corresponding to the clauses.

The preset quantity may be configured based on actual needs, for example, based on a requirement on translation speed. The preset quantity may be set larger when a relatively high translation speed is required, and may be set smaller w % ben a relatively low translation speed is required. In some embodiments, the server determines an available processing speed of the server, and/or other tasks the server is presently performing and their processing requirements, and determines the preset quantity accordingly.

Content corresponding to each clause is at least two words of the to-be-translated sentence. For example, if the to-be-translated sentence includes 12 words, the preset quantity is 3, and sentence lengths corresponding to the clauses are the same, that is, each clause contains the same quantity of words, the quantity of words included in each clause is 4. That is, every four words in the to-be-translated sentence are grouped into a clause, to obtain three clauses. During translation of the to-be-translated sentence, the translation may be started from the first word of each of the three clauses in parallel, to obtain translation results corresponding to the four words included in each of the three clauses.

In some embodiments of this application, the quantity of words included in at least two of the clauses may be the same or different. In this way, the to-be-translated sentence may also be divided in a reasonable manner when the quantity of words included in the to-be-translated sentence is not in an integer proportion to the quantity of clauses.

Step S140: Fuse the translation results corresponding to the clauses according to semantics, to obtain a target translation sentence corresponding to the to-be-translated sentence.

After the translation results corresponding to the clauses are determined, the translation results corresponding to the clauses are fused (e.g., combined, merged) together so that semantics of each translated word in the translation result corresponds to semantics of a corresponding word in the to-be-translated sentence, to obtain the target translation sentence corresponding to the to-be-translated sentence.

In practice, during fusion of the translation results corresponding to the clauses, the fusion may be performed according to the semantics of the words in the translation results to ensure that the semantics expressed by the fused sentence is consistent with the semantics expressed by the to-be-translated sentence.

In the solution of this application, during the translation of the to-be-translated sentence, the to-be-translated sentence may be divided based on a preset quantity to obtain the preset quantity of clauses, and then each clause may be translated separately to obtain respective translation results corresponding to the clauses. According to the solution of this application, each clause includes at least two words of the to-be-translated sentence, thus allowing parallel translation of at least two words in the to-be-translated sentence during translation of the clauses, instead of translating the to-be-translated sentence word by word. Therefore, the translation speed may be accelerated in the process of obtaining the target translation sentence corresponding to the to-be-translated sentence.

In the solution of this application, the to-be-translated sentence may be encoded by an encoder first to obtain encoding information corresponding to the to-be-translated sentence, and then encoding information corresponding to each clause is translated based on the preconfigured clause quantity to obtain the target translation sentence of the to-be-translated sentence.

In some embodiments of this application, when the sentence lengths of at least two of the clauses are different, that is, at least two of the clauses include different numbers of words, the sentence lengths corresponding to the clauses may be determined in the following manner:

setting (e.g., specifying), based on the preset quantity of clauses within the to-be-translated sentence and the sentence length of the to-be-translated sentence, a sentence length of a first clause in the clauses that satisfies a first set ratio to a first length of a first predefined number; and setting a sentence length of a second clause in the clauses that satisfies a second set ratio to a second length of a second predefined number;

A sum of the first set ratio and the second set ratio is 1.

The first set ratio and the second set ratio may be configured based on actual needs, and the first set ratio may be the same as or different from the second set ratio. The sum of the first set ratio and the second set ratio is 1, indicating that a sum of the quantity of clauses satisfying the first set ratio and the quantity of clauses satisfying the second set ratio is equal to the preset clause quantity.

The configuration of the first set ratio and the second set ratio may be independent of the quantity of words included in the to-be-translated sentence, that is, regardless of the quantity of words included in the to-be-translated sentence, the to-be-translated sentence is divided into clauses according to the preset quantity of clauses, the first set ratio and the second set ratio.

The first length is different from the second length. The first length represents a sentence length corresponding to each first clause, and each first clause includes the same quantity of words. Similarly, the second length represents a sentence length corresponding to each second clause, and each second clause includes the same quantity of words.

The to-be-translated sentence is divided into clauses based on the preset clause quantity, the first set ratio, and the second set ratio. In the process of dividing the to-be-translated sentence into clauses, if the quantity of words included in the to-be-translated sentence is not equal to a sum of the quantity of words corresponding to the first clauses and the quantity of words corresponding to the second clauses, a clause that does not meet the sentence length may be padded with a specific mark, and the specific mark does not need to be translated during translation.

In practice, to-be-translated sentences corresponding to the clauses are continuous, that is, the last word of a previous clause is continuous with the first word of a next clause.

In some embodiments of this application, any clause may be translated based on the autoregressive NMT technology, that is, the translation is performed word by word. When autoregressive NMT is used for translation, a translation result corresponding to each word is based on translation results of previously translated words to ensure continuity between the words.

For example, if the pre-configured clause quantity is 4, the first set ratio is 0.25, the second set ratio is 0.75, and the quantity of words included in the to-be-translated sentence is 13, the sentence length corresponding to 0.25*4=1 clause [i.e., one clause] is set to the first length, and the sentence length corresponding to 0.75*4=3 clauses [i.e., three clauses] is set to the second length. In these 13 words of the sentence, if four words may be grouped into one clause, the first length of the clause is four words; every three words in the remaining words may be grouped into one clause to obtain a total of three clauses, and the second length of each clause is three words.

In the foregoing example, if the quantity of words included in the to-be-translated sentence is 12 or 15, the clause that does not meet the first length (4) or the second length (3) may be padded with the specific mark, so that a length of a to-be-translated sentence corresponding to the padded clause satisfies the first length (4) or the second length (3). For example, for a to-be-translated sentence including 12 words, the last clause (which has only two words) is padded with the specific mark, so that the clause after padding includes three words.

In some embodiments of this application, the separately translating the clauses to obtain respective translation results corresponding to the clauses includes:

obtaining, from a candidate translation word set, respective translation results corresponding to the clauses.

The candidate translation word set includes candidate translation words corresponding to various words, one word may correspond to at least one candidate translation word, and the candidate translation word may be a word in different languages. During the translation of the to-be-translated sentence, words corresponding to each clause may be translated to obtain the translation result corresponding to the each clause.

In practice, if one to-be-translated word corresponds to at least two candidate translation words, by determining probabilities of the at least two candidate translation words, a candidate translation word with the highest probability is used as the target translation word of the to-be-translated word.

In practice, candidate translation words corresponding to each to-be-translated word may correspond to a subset, that is, the candidate translation word set includes respective subsets corresponding to the to-be-translated words.

In some embodiments of this application, the candidate translation word set includes a translation end tag, and for any clause, the sentence length corresponding to the clause is determined in the following manner:

determining, from the candidate word translation set, respective candidate translation words corresponding to the words in the clause; and determining a sentence length corresponding to the clause based on the determined candidate translation words and the translation end tag.

In the solution of this application, the sentence lengths corresponding to the clauses may be pre-configured. However, considering that the translation process is prone to translation errors (e.g., repeated or duplicate translated words, and/or missing words) due to simultaneous translation of multiple corresponding to-be-translated sentences, the sentence lengths corresponding to the clauses may be determined in the translation process based on the candidate translation words corresponding to the clauses and the translation end tag to avoid translation errors.

In addition, the sentence length corresponding to each clause is proportional to the translation speed of this clause, thus directly affecting the translation speed of the to-be-translated sentence. During the translation of the clauses, words of different lengths correspond to different amounts of information, and the translation speed may also be different. Therefore, considering the translation speed and translation accuracy, the sentence length corresponding to each clause may be determined dynamically. The specific determining manner is as follows:

The translation end tag is added the candidate translation word set, and during the translation of the clauses, for any to-be-translated word in the to-be-translated sentence, a candidate translation word corresponding to the to-be-translated word is determined from the candidate translation word set, and if the candidate translation word is the translation end tag, the translation of the clause stops, and at the same time, the sentence length corresponding to the clause is obtained. If the candidate translation word is not the translation end tag, the translation of the clause continues until the candidate translation word is the translation end tag, and the sentence length corresponding to the clause is determined. The sentence length determined in the foregoing manner is a sentence length containing the to-be-translated word at the end of the translation and each to-be-translated word before the to-be-translated word. By using the manner of dynamically determining the sentence length, the sentence length corresponding to each clause may be dynamically determined during the translation of the clauses, to further improve the translation speed.

The translation end tag may be expressed by a specified character string, and a specific expression form of the translation end tag is not limited in the solution of this application. In an example, the translation end tag may be EOS.

In some embodiments of this application, the candidate translation word set includes a translation start tag and a translation end tag.

The obtaining, from a candidate translation word set, respective translation results corresponding to the clauses includes:

determining, for any clause, from the candidate translation word set, a candidate translation word corresponding to each to-be-translated word in the clause;

starting to translate the clause in accordance with a determination that the candidate translation word is the translation start tag; and continuing to translate the clause in accordance with a determination that the candidate translation word is neither the translation start tag nor the translation end tag, until the candidate translation word is the translation end tag, and ending the translation of the clause to obtain the translation result corresponding to the clause.

During translation of the clauses, for any clause, a translation start time of the clause may be determined based on the translation start tag corresponding to the clause, and a translation end time of the clause may be determined based on the translation end tag corresponding to the clause. Specifically, during translation of a clause, the words in the clause are translated one by one. For any one of the words, a candidate translation word corresponding to the word may be determined, and the translation of the clause is started when the candidate translation word is the translation start tag. When the candidate translation word is neither the translation start tag nor the translation end tag, translation of words following the current word continues until a candidate translation word is the translation end tag, and then the translation of the clause is ended to obtain the translation result corresponding to the clause.

In some embodiments of this application, the separately translating the clauses to obtain respective translation results corresponding to the clauses includes:
  separately translating the clauses to obtain respective preliminary translation results corresponding to the clauses; and
  performing, in accordance with a determination that any preliminary translation result has a translation error, error correction on the preliminary translation result with the translation error; and obtaining the translation results corresponding to the clauses based on each corrected preliminary translation result and other uncorrected preliminary translation results; or
  using the preliminary translation results as the translation results corresponding to the clauses in accordance with a determination that there is no translation error in the preliminary translation results.

During the translation process, there may be translation errors, for example, repeatedly translated words, or untranslated words in the to-be-translated sentence, that is, words that are omitted during translation. Therefore, before determining the translation results corresponding to the clauses, the translation errors in the preliminary translation results need to be corrected to ensure the accuracy of the translation results.

Specifically, during translation of any clause, the preliminary translation result of the clause may be determined first, and if there is a translation error in the preliminary translation result, the preliminary translation result is corrected, and a corrected preliminary translation result is used as the translation result corresponding to the clause. If there is no translation error in the preliminary translation result, the preliminary translation result is used as the translation result corresponding to the clause.

In some embodiments of this application, the translation error includes at least one of a missing word or a repeatedly translated word, and the method further includes:
  determining, for any clause, whether there is a translation error in the clause based on each word in the preliminary translation result corresponding to the clause; and/or
  determining, for any two adjacent clauses in the clauses, whether there is a translation error in the two adjacent clauses based on the last word in the preliminary translation result corresponding to the first clause in the two adjacent clauses and the first word in the preliminary translation result corresponding to the second clause in the two adjacent clauses.

When the translation error includes a missing word, the performing error correction on the preliminary translation result with the translation error includes:
  translating the missing word.

When the translation error includes a repeatedly translated word (e.g., a translated word appears in duplicate), the performing error correction on the preliminary translation result with the translation error includes:
  deleting, from the preliminary translation result with the translation error, the repeatedly translated word.

As for how to determine whether there is a translation error in the preliminary translation result, it may be determined, based on each word in the preliminary translation result corresponding to a clause, whether there is a translation error in the preliminary translation result, that is, whether there is a repeatedly translated word and/or a missing word in the clause.

In consideration of the continuity of words between two adjacent clauses, it may also be determined, based on the preliminary translation results corresponding to the two clauses, whether there is a translation error in the two preliminary translation results. For example, in the two clauses, if the last word in the preliminary translation result corresponding to the former clause is not semantically continuous with the first word in the preliminary translation result corresponding to the latter clause, it may be determined that there is a missing word, that is, an untranslated word, in the two preliminary translation results. Alternatively, in the two clauses, if the last word in the preliminary translation result corresponding to the former clause is the same as the first word in the preliminary translation result corresponding to the latter clause, it may be determined that there is a repeatedly translated word.

If there is a missing word, the missing word is translated to obtain a translation word corresponding to the missing word, so as to correct the translation error. If there is a repeatedly translated word, the repeatedly translated word is deleted to correct the translation error.

In some embodiments of this application, the translation results corresponding to the clauses are determined from the candidate translation word set, and the candidate translation word set further includes a deletion tag used for identifying a translation result of a corresponding clause as a repeatedly translated word.

The deleting, from the preliminary translation result with the translation error, the repeatedly translated word includes:
  deleting, from the preliminary translation result with the translation error, the repeatedly translated word corresponding to the deletion tag.

When the translation error is the repeatedly translated word, the translation error may also be corrected based on the deletion tag that is used for identifying a translation result of a corresponding clause as a repeatedly translated word. That is, if the deletion tag is present in a preliminary translation result corresponding to a clause, the preliminary translation result corresponding to the clause is repeated. In this scenario, the preliminary translation result of the clause that is corresponding to the deletion tag (a preliminary translation result corresponding to a clause) may be deleted based on the deletion tag, so as to correct the translation error in the translation result corresponding to the clause.

The deletion tag may be expressed by a specified character string, and a specific expression form of the deletion tag is not limited in the solution of this application. In an example, the deletion tag may be DEL.

During translation of the clauses, if a candidate translation word is the deletion tag, translation of the to-be-translated sentence corresponding to the clause may also be stopped, thereby saving translation time.

In some embodiments of this application, the operations of dividing the to-be-translated sentence according to a preset quantity to obtain the preset quantity of clauses, and separately translating the clauses to obtain respective translation results corresponding to the clauses are implemented through a translation model.

The translation model is obtained by training in the following manner:
  obtaining training samples, the training samples each including a to-be-translated sample sentence and a translated sample sentence corresponding to the to-be-translated sample sentence, the translated sample sentence including sub-sample sentences obtained by dividing the translated sample sentence according to a sample clause quantity, each sub-sample sentence carrying a label that represents a translation labeling result of the to-be-translated sample sentence corresponding to the sub-sample sentence; and training, based on each training sample, an initial neural network model until a loss function of the initial neural network model converges, and using an initial neural network model at the end of the training as the translation model.

The neural network (NN) is an algorithm mathematical model that simulates behavior features of an animal neural network and carries out distributed parallel information processing. Such a network implements information processing by adjusting, depending on the complexity of a system, an inter-connection relationship of a large number of internal nodes.

An output of the initial neural network model is translation prediction results of the clauses corresponding to the to-be-translated sample sentence, and a value of the loss function represents a difference between the translation labeling result and the translation prediction result corresponding to the to-be-translated sample sentence.

Each training sample includes a to-be-translated sample sentence and a translated sample sentence corresponding to the to-be-translated sample sentence (a target translation sentence corresponding to the to-be-translated sample sentence). The translated sample sentence is divided based on the sample clause quantity to obtain sub-sample sentences corresponding to the translated sample sentence.

Each sub-sample sentence carries a label that represents a translation labeling result of the to-be-translated sample sentence corresponding to the sub-sample sentence, and the translation labeling result represents a correctly translated sentence corresponding to the sub-sample sentence. The label may be made manually. The label may be a character string, a text, a number, or the like, and a specific expression form of the label is not limited in this application.

In the solution of this application, an input of the translation model is the training samples, and an output is the translation prediction results of the clauses corresponding to the to-be-translated sample sentence of each training sample, that is, the translation prediction results of the sub-sample sentences in the to-be-translated sample sentence.

To enable the trained translation model to quickly and accurately translate a to-be-translated sentence, that is, to ensure that there is no translation error in the target translation sentence obtained by translation, the training samples for training the translation model may include translation errors. The translation model, which is trained based on the training samples including translation errors, is capable of correcting translation errors in the translation results to obtain correct translation results.

Figure 2:
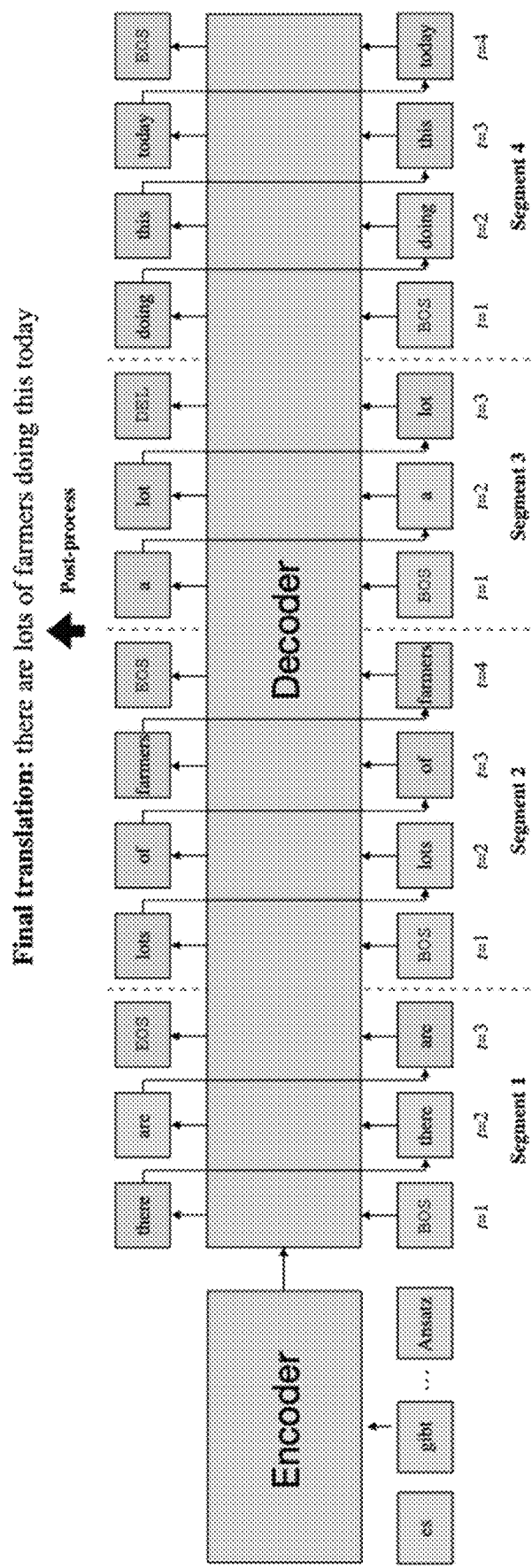
FIG. 2 is a schematic diagram of a training process of a translation model according to an embodiment of this application.

In an example, as shown in FIG. 2, which is a schematic diagram of translation model training, when the first word in clause 2 generated by a decoder is "of", the decoder only needs to, when predicting clause 1, generate a word "lots" before EOS (end of sentence) to recover (correct) from an omitted word (missing word) error. In contrast, when the first word of the generated clause 2 is "are", the model only needs to, when predicting clause 1, generate one less word (that is, not generate "are"), thus correcting a repeatedly translated word error.

In some embodiments of this application, for any training sample, the training sample further includes a translated sample sentence including a repeatedly translated word, and the translated sample sentence including repeatedly translated word is determined in the following manner:

dividing the translated sample sentence into a first quantity of clauses, the first quantity being less than the sample clause quantity;

determining at least one of the first quantity of clauses as the repeatedly translated word; and inserting the repeatedly translated word into the translated sample sentence to obtain the translated sample sentence including the repeatedly translated word.

To obtain a training sample including a repeatedly translated word, the translated sample sentence may be divided into a first quantity of clauses. At least one of the first quantity of clauses is selected as the repeatedly translated word, and the repeatedly translated word is inserted into the translated sample sentence, so that the translated sample sentence includes clauses of the sample clause quantity, and thus a translated sample sentence including the repeatedly translated word is obtained.

In an example, the sample clause quantity is K, and the translated sample sentence is divided into K−1 (the first quantity) clauses, which are respectively $S^1, S^2 \ldots, S^{K-1}$, one clause is randomly selected from the K−1 (the first quantity) clauses and is copied, or, m words in the clause are selected and copied, where m is not less than the quantity of words included in the clause. Then, a deletion tag DEL is added to the copied word to obtain a repeatedly translated word, which is expressed as $S_{rdu}^i$, and the repeatedly translated word is inserted into a right side of $S^i$, where $S^i$ is any one of $S^1, S^2 \ldots, S^{K-1}$. Finally, K clauses are obtained, which are $S^1, S^2 \ldots S^i S_{rdu}^i, S^{i+1}, \ldots, S^{K-1}$.

A specific example is as follows: as shown in FIG. 3, in the translated sample sentence including repeatedly translated words, words with different gray levels correspond to different clauses. In this example, K=4, m=2 (the quantity of copied words is 2). The translated sample sentence (Target Sentence) is "there are lots of farmers doing this today", the repeatedly translated words are "lots of", and the translated sample sentence (+Pseudo Redundant Segment) including the repeated translated words is "there are lots of farmers lots of DEL doing this today".

In some embodiments of this application, a method for enabling the model to learn to delete a repeatedly translated word (e.g., delete a translated word that appears in duplicate) is to add a repeatedly translated word to the training sample. However, if a repeatedly translated word is added to the training sample, the model mistakenly considers that it is necessary to generate a repeatedly translated word first and then delete the repeatedly translated word, which is not expected by the method of this application. Therefore, in the solution of this application, whether to add a repeatedly translated word to a translated sample sentence of a training sample is randomly determined according to a certain probability q.

In some embodiments of this application, for any training sample, sample lengths of the sub-sample sentences in the training sample are determined in the following manner:

determining, based on a discrete probability distribution, a sentence length of the translated sample sentence, the sample clause quantity, and a division manner, a selection probability corresponding to the division manner, where there are two division manners: a random division manner and a uniform division manner; and determining the sample lengths of the sub-sample sentences based on the selection probability corresponding to the division manner and the sentence length of the translated sample sentence.

During the model training process, a maximum sentence length in each clause is directly proportional to the translation speed, and the translated sample sentence of each training sample needs to be divided into clauses of equal lengths (same sample lengths) during training, so as to encourage the model to generate clauses of equal lengths during prediction; In addition, in the training phase, the model needs to be exposed to errors related to multimodality (repeatedly translated words and missing words) during training, thereby enhancing the ability of recovering from such errors, that is, the ability of correcting translation errors in the translation results. Accordingly, the sentence lengths corresponding to the clauses may be determined in a random manner, that is, the sentence lengths corresponding to the clauses may be different.

Therefore, to achieve a balance between the translation speed and the ability to recover from errors, it is necessary to consider how to divide the translated sample sentence to determine the sentence lengths corresponding to the clauses, that is, it is necessary to determine which clauses correspond to translated sample sentences of the first length, and which clauses correspond to translated sample sentences of the second length.

In the solution of this application, the discrete probability distribution may be Bernoulli distribution, through which the selection probabilities of the two different division manners are determined.

In the solution of this application, is an example, during the model training process, whether to divide the translated sample sentence in the training sample in a uniform division manner or in a random division manner is determined in the following manner. The formula is as follows:

$$s \sim \text{Bernoulli}(p)$$
$$r = \begin{cases} \text{EQUAL}(T, K-1) & s = 0 \\ \text{RAND}(T, K-1) & s = 1 \end{cases}$$

where T represents the length of the translated sample sentence, Bernoulli(p) represents Bernoulli distribution with a parameter p, and r represents a division index set, that is, the random division manner and the uniform division manner.

$$\text{EQUAL}(n, m) = \left\{ \left\lceil \frac{n}{m+1} \right\rceil, \left\lceil \frac{2n}{m+1} \right\rceil, \ldots, \left\lceil \frac{mn}{m+1} \right\rceil \right\}$$

RAND(m, n) represents randomly sampling m unique integers in an interval of [1, n]. n is T, and m is K−1; when s=0, it indicates that the corresponding division manner is the uniform division manner, when s=1, it indicates that the corresponding division manner is the random division manner, and p represents the selection probability.

When p takes a larger value, the trained model has a better error recovery ability; and when p takes a smaller value, the model may be encouraged to generate clauses of similar lengths, that is, the translation speed is faster. To achieve a balance between the two aspects, in this application, p is gradually reduced from 1 to 0 during the training process, and the proportions of the random division manner and the uniform division manner are determined by the selection probability p, to achieve a better balance between the translation speed and the error recovery ability.

By dynamically determining the sample lengths corresponding to the clauses in the foregoing manner, rather than based on a pre-specified sample length, the translation capability of the model may be improved.

In practice, the division manner for determining the sentence length may be selected based on the selection probability obtained by training. In an example, the uniform division manner is selected when the selection probability is (1-p), and the random division manner is selected when the selection probability is p, and the to-be-translated sentence is divided according to the pre-configured clause quantity.

In an example, after the selection probability is determined, that is, after it is determined that the translated sample sentence is divided in the uniform division manner when the probability is 1-p, and divided in the random division manner when the probability is p, in this example, a translated sample sentence in a training sample is y, and the translated sample sentence y is divided into multiple clause clauses, which are $S^1, S^2, \ldots, S^K$, based on the clause quantity K; a sample length L corresponding to each clause may be dynamically determined based on the pre-configured clause quantity K and the translation end tag, specifically as follows:

For example, a sub-sample sentence is $S^i$; a word that is most likely to be a translation result corresponding to a $t^{th}$ word in the $S^i$ may be determined from a candidate translation word set V by the following formula:

$$\hat{S}_t^i = \underset{S_t^i \in V \cup \{EOS, DEL\}}{\text{argmax}} P(S_t^i | S_{<t}^1 \ldots S_{<t}^K; x)$$

where $\hat{S}_t^i$ is the word that is most likely to be the translation result corresponding to the $t^{th}$ word in the $S^i$, and the candidate translation word set includes the deletion tag and the translation end tag.

$\hat{S}_t^i$ has the following three possibilities:

(1) When $\hat{S}_t^i \in V$, $S^i$ is incomplete, indicating that translation of the corresponding to-be-translated words in the $S^i$ has not yet been finished, the clause generation process continues, that is, the translation of the to-be-translated sample sentence corresponding to the $S^i$ continues.

(2) When $\hat{S}_t^i$=EOS, $S^i$ is complete, indicating that translation of the corresponding to-be-translated words in the $S^i$ has been completed, the clause generation process stops, that is, the translation of the to-be-translated sample sentence corresponding to the $S^i$ is ended.

(3) When $\hat{S}_t^i$=DEL, $S^i$ is redundant, indicating that the clause is to be deleted, the clause generation process is to be stopped; therefore, it is unnecessary to translate the to-be-translated sentence corresponding to the clause.

The whole translation process stops when all clauses stop being generated. The sentence lengths L of the to-be-translated sample sentences corresponding to the clauses are determined.

The training process of the translation model of this application is described in detail with reference to FIG. 2 and the following specific example, and the specific solution is as follows:

Referring to the schematic diagram of translation model training shown in FIG. 2, in this example, a translated sample sentence in a training sample is y, and the clause quantity is K. Based on the clause quantity K, the translated sample sentence y is divided into multiple clause clauses, which are $S^1, S^2 \ldots, S^K$ respectively. For brief description, in this example, the sentence lengths corresponding to all the clauses are the same, which are all denoted by L;

The initial neural network model is trained based on the training samples, and the initial neural network model may be expressed by the following probability formula:

$$P(y|x) = \prod_{t=1}^{L}\prod_{i=1}^{K} P(S_t^i | S_{<t}^1 \ldots S_{<t}^K; x)$$

In this formula, x represents a to-be-translated sample sentence, $S_t^i$ represents a $t^{th}$ word of an $i^{th}$ clause, and $S_{<t}^i = \{S_1^i, \ldots, S_{t-1}^i\}$ represents a translation result before the $t^{th}$ word of the $i^{th}$ clause.

In this example, the to-be-translated sample sentence is "es gibt . . . Ansatz" in German shown in FIG. 2. The initial neural network model includes an encoder and a decoder. First, the to-be-translated sample sentence is inputted to the encoder, and then an output of the encoder is used as an input of the decoder. In this example, K is 4, and the clauses are clause 1, clause 2, clause 3, and clause 4, respectively. In this example, the sentence length L corresponding to clause 1 is 2, the sentence length L corresponding to clause 2 is 3, the sentence length L corresponding to clause 3 is 2, and the sentence length L corresponding to clause 4 is 3. The translation start tag is BOS, the translation end tag is EOS, and the deletion tag is DEL.

During simultaneous translation of the sub-sample sentences, the sentence corresponding to each clause is translated word by word. During translation, a candidate translation word corresponding to the first word in each clause is determined from the candidate translation word set V. If the candidate translation word is the translation start tag, translation of the first words in the sub-sample sentences is started simultaneously. A translation result corresponding to the first word in clause 1 is "there", a translation result corresponding to the first word in clause 2 is "lots", a translation result corresponding to the first word in clause 3 is "a", and a translation result corresponding to the first word in clause 4 is "doing".

After the first word in each sub-sample sentence is translated, as shown in FIG. 2, content shown in bold line boxes in the clauses has been translated. Therefore, based on the content shown in the bold line box, in the subsequent translation process, correctness of translation of two adjacent clauses can be ensured, and translation errors are avoided. After the first word in each sub-sample sentence is translated, translation of the second word corresponding to each clause continues based on the candidate translation word set. If a candidate translation word corresponding to the second word is the translation end tag EOS, the translation of the sample sentence is ended.

As shown in FIG. 2, all the sub-sample sentences include the translation start tag and the translation end tag, the translation start time is determined based on the translation start tag, and the translation end time is determined based on the translation end tag.

During the translation process, the to-be-translated sample sentences corresponding to the clauses may be translated based on the translation end tag, specifically as follows:

For one clause, for example, a sub-sample sentence $S^i$, a word that is most likely to be the translation result corresponding to the $t^{th}$ word in the $S^i$ may be determined from the candidate translation word set V by the following formula $$\hat{S}_t^i = \underset{S_t^i \in V \cup \{EOS, DEL\}}{\mathrm{argmax}} P(S_t^i | S_{<t}^1 \ldots S_{<t}^K; x)$$

where $\hat{S}_t^i$ is the word that is most likely to be the translation result corresponding to the $t^{th}$ word in the $S^i$, and the candidate translation word set includes the deletion tag and the translation end tag.

$\hat{S}_t^i$ has the following three possibilities:

(1) When $\hat{S}_t^i \in V$, $S^i$ is incomplete, indicating that translation of the corresponding to-be-translated words in the $S^i$ has not yet been finished, the clause generation process continues, that is, the translation of the to-be-translated sample sentence corresponding to the $S^i$ continues.

(2) When $\hat{S}_t^i$=EOS. $S^i$ is complete, indicating that translation of the corresponding to-be-translated words in the $S^i$ has been completed, the clause generation process stops, that is, the translation of the to-be-translated sample sentence corresponding to the $S^i$ is ended.

(3) When $\hat{S}_t^i$=DEL, $S^i$ is redundant, indicating that the clause needs to be deleted, the clause generation process needs to be stopped; therefore, it is unnecessary to translate the to-be-translated sentence corresponding to the clause.

The whole translation process stops when all clauses stop being generated.

After the whole translation process stops, if the deletion tag DEL is included in the initial translation result corresponding to a clause, it means that the initial translation result corresponding to the clause is a repeatedly translated result, and the repeatedly translated result may be deleted.

After the deletion, a translation prediction result corresponding to the to-be-translated sample sentence may be obtained, that is, "there are lots of farmers doing this today" shown in FIG. 2 may be obtained. Then, based on the translation prediction result and the translation labeling result corresponding to the to-be-translated sample sentence, it is determined whether the loss function of the initial neural network model converges. When the loss function converges, the training is ended, and the initial neural network model at the end of the training is used as the translation model.

Figure 4:
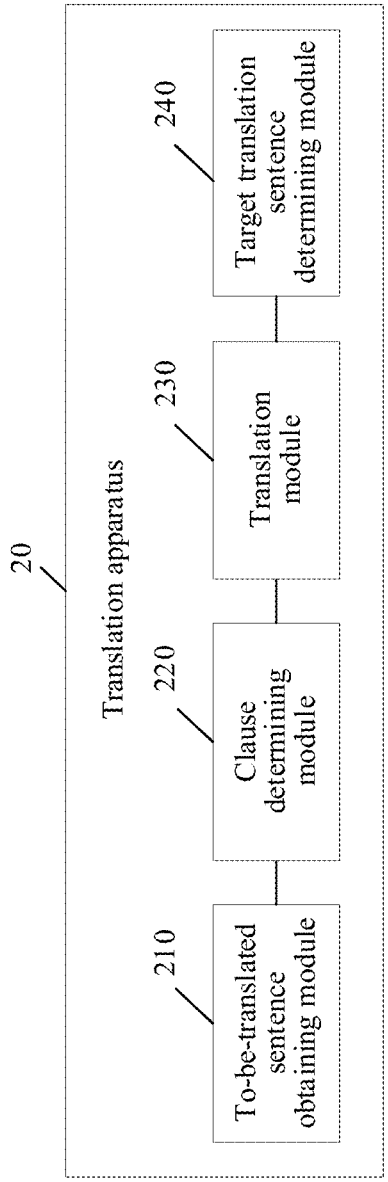
FIG. 4 is a schematic structural diagram of a translation apparatus according to an embodiment of this application.

Based on the same principle as the method shown in FIG. 1B, an embodiment of this application further provides a translation apparatus 20. As shown in FIG. 4, the translation apparatus 20 may include a to-be-translated sentence obtaining module 210, a clause determining module 220, a translation module 230 and a target translation sentence determining module 240, where the to-be-translated sentence obtaining module 210 is configured to obtain a to-be-translated sentence;

the clause determining module 220 is configured to divide the to-be-translated sentence according to a preset quantity to obtain the preset quantity of clauses;

the translation module 230 is configured to separately translate the clauses to obtain respective translation results corresponding to the clauses; and the target translation sentence determining module 240 is configured to fuse the translation results corresponding to the clauses according to semantics, to obtain a target translation sentence corresponding to the to-be-translated sentence.

In the solution of this application, during translation of the to-be-translated sentence, the to-be-translated sentence may be divided based on a preset quantity to obtain the preset quantity of clauses, and then the clauses may be translated separately to obtain respective translation results corresponding to the clauses. Based on the solution of this application, each clause includes at least two words of the to-be-translated sentence, thus allowing parallel translation of at least two words in the to-be-translated sentence during translation of the clauses, instead of translating the to-be-translated sentence word by word. Therefore, the translation speed may be accelerated in the process of obtaining the target translation sentence corresponding to the to-be-translated sentence.

In some embodiments, sentence lengths corresponding to at least two of the clauses are different, and the sentence length represents the quantity of words included in a corresponding clause.

In some embodiments, the apparatus further implements the following operations:
setting, based on the preset quantity and the sentence length of the to-be-translated sentence, a sentence length of each first clause in the clauses that satisfies a first set ratio to a first length; and setting a sentence length of each second clause in the clauses that satisfies a second set ratio to a second length;
where a sum of the first set ratio and the second set ratio is 1.

In some embodiments, the translation module 230, when separately translating the clauses to obtain the translation results corresponding to the clauses, is specifically configured to:
obtain, from a candidate translation word set, respective translation results corresponding to the clauses.

In some embodiments, the candidate translation word set includes a translation end tag, and for any clause, a sentence length corresponding to the clause is determined in the following manner:
determining, from the candidate word translation set, respective candidate translation words corresponding to the words in the clause:
determining, based on the determined candidate translation words and the translation end tag, the sentence length corresponding to the clause.

In some embodiments, the candidate translation word set includes a translation start tag and a translation end tag;
The translation module 230, when obtaining, from the candidate translation word set, the translation results corresponding to the clauses, is specifically configured to:
determine, for any clause, from the candidate translation word set, a candidate translation word corresponding to each to-be-translated word in the clause:
start to translate the clause when the candidate translation word is the translation start tag; and
continue to translate the clause when the candidate translation word is neither the translation start tag nor the translation end tag, until the candidate translation word is the translation end tag, and end the translation of the clause to obtain the translation result corresponding to the clause.

In some embodiments, the translation module 230, when separately translating the clauses to obtain the translation results corresponding to the clauses, is specifically configured to:
separately translate the clauses to obtain respective preliminary translation results corresponding to the clauses:

perform, in accordance with a determination that any of the preliminary translation results has a translation error, error correction on the preliminary translation result with the translation error; and obtain, based on each corrected preliminary translation result and other uncorrected preliminary translation results, the translation results corresponding to the clauses.

In some embodiments, the translation error includes at least one of a missing word or a repeatedly translated word, and the apparatus further includes a translation error determining module.

The translation error determining module is configured to determine, for any clause, whether there is a translation error in the clause based on each word in the preliminary translation result corresponding to the clause;
and/or
the translation error determining module is configured to determine, for any two adjacent clauses in the clauses, whether there is a translation error in the two adjacent clauses based on the last word in the preliminary translation result corresponding to the first clause in the two adjacent clauses and the first word in the preliminary translation result corresponding to the second clause in the two adjacent clauses.

If the translation error includes a missing word, the clause translation module 220, when performing error correction on the preliminary translation result with the translation error, is specifically configured to translate the missing word.

If the translation error includes a repeatedly translated word, the clause translation module 220, when performing error correction on the preliminary translation result with the translation error, is configured to:
delete the repeatedly translated word from the preliminary translation result with the translation error.

In some embodiments, the translation results corresponding to the clauses are determined from the candidate translation word set, and the candidate translation word set further includes a deletion tag used for identifying a translation result of a corresponding clause as a repeatedly translated word.

The translation module 230, w % ben deleting the repeatedly translated word from the preliminary translation result with the translation error, is specifically configured to:
delete, from the preliminary translation result with the translation error, the repeatedly translated word corresponding to the deletion tag.

In some embodiments, the operations of dividing the to-be-translated sentence according to a preset quantity to obtain the preset quantity of clauses, and separately translating the clauses to obtain respective translation results corresponding to the clauses are implemented through a translation model.

The apparatus further includes a model training module, configured to train the translation model, the translation model being obtained by training in the following manner:
obtaining training samples, the training samples each including a to-be-translated sample sentence and a translated sample sentence corresponding to the to-be-translated sample sentence, the translated sample sentence including sub-sample sentences obtained by dividing the translated sample sentence according to a sample clause quantity, each sub-sample sentence carrying a label that represents a translation labeling result of the to-be-translated sample sentence corresponding to the sub-sample sentence; and training, based on each training sample, an initial neural network model until a loss function of the initial neural network model converges, and using an initial neural network model at the end of the training as the translation model.

In some embodiments, for any training sample, sample lengths of the sub-sample sentences in the training sample are determined in the following manner:
  determining, based on a discrete probability distribution, a sentence length of the translated sample sentence, the sample clause quantity, and a division manner, a selection probability corresponding to the division manner; and
  determining the sample lengths of the sub-sample sentences based on the selection probability corresponding to the division manner and the sentence length of the translated sample sentence.

In some embodiments, for any training sample, the training sample further includes a translated sample sentence including a repeatedly translated word, and the translated sample sentence including the repeatedly translated word is determined in the following manner:
  dividing the translated sample sentence into a first quantity of clauses, the first quantity being less than the sample clause quantity;
  determining at least one of the first quantity of clauses as the repeatedly translated word; and
  inserting the repeatedly translated word into the translated sample sentence to obtain the translated sample sentence including the repeatedly translated word.

The translation apparatus provided in the embodiments of this application is an apparatus that can perform the translation method in the embodiments of this application. Therefore, based on the translation method provided in the embodiments of this application, a person skilled in the art can learn specific implementations of the translation apparatus in the embodiments of this application and various variations thereof, and a manner in which the translation apparatus implements the translation method in the embodiments of this application is not described in detail herein. All translation apparatuses used when a person skilled in the art implements the translation method in the embodiments of this application shall fall within the protection scope of this application.

Based on the same principle of the translation method and translation apparatus provided in the embodiments of this application, an embodiment of this application further provides an electronic device. The electronic device may include a processor and a memory. The memory stores readable instructions. The readable instructions, when loaded and executed by the processor, may implement the method shown in any embodiment of this application.

Figure 5:
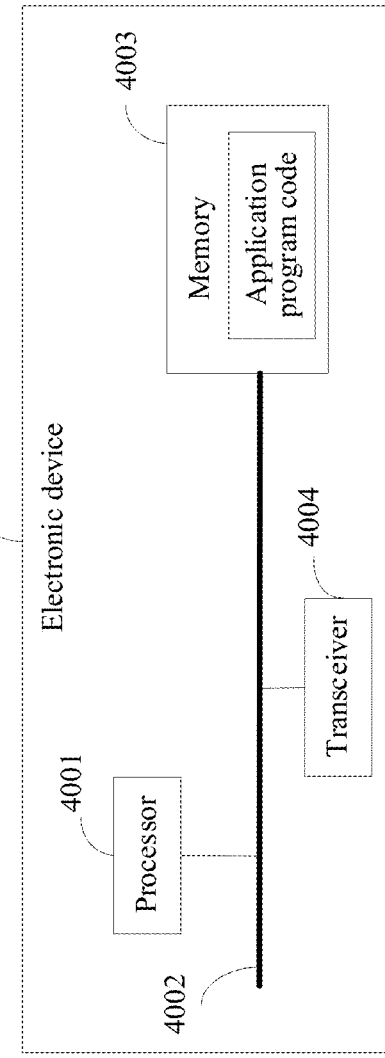
FIG. 5 is a schematic structural diagram of an electronic device according to an embodiment of this application.

In an example, FIG. 5 is a schematic structural diagram of an electronic device 4000 to which the solution in the embodiments of this application is applicable. As shown in FIG. 5, the electronic device 4000 may include a processor 4001 and a memory 4003. The processor 4001 and the memory 4003 are connected, for example, are connected by using a bus 4002. In some embodiments, the electronic device 4000 may further include a transceiver 4004. In practice, there may be one or more transceivers 4004. The structure of the electronic device 4000 does not constitute a limitation on this embodiment of this application.

The processor 4001 may be a central processing unit (CPU), a general-purpose processor, a digital signal processor (DSP), an application specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in this application. The processor 4001 may be alternatively a combination to implement a computing function, for example, a combination of one or more microprocessors, or a combination of a DSP and a microprocessor.

The bus 4002 may include a channel, to transmit information between the foregoing components. The bus system 4002 may be a peripheral component interconnect (PCI) bus, an extended industry standard architecture (EISA) bus, or the like. The bus 4002 may be classified into an address bus, a data bus, a control bus, and the like. For ease of description, the bus in FIG. 5 is represented by using only one bold line, but it does not indicate that there is only one bus or one type of bus.

The memory 4003 may be a read-only memory (ROM) or a static storage device of another type that can store static information and instructions, a random access memory (RAM) or a dynamic storage device of another type that can store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, or a Blu-ray disc, and the like), a disk storage medium or another magnetic storage device, or any other medium that can be used to carry or store expected program code in a command or data structure form and that can be accessed by a computer, but is not limited thereto.

The memory 4003 is configured to store application program code for performing the solutions of this application, and is controlled and executed by the processor 4001. The processor 4001 is configured to execute the application program code stored in the memory 4003, so as to implement the solution shown in the embodiment of any one of the foregoing methods.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of this application. A person of ordinary skill in the art may make several improvements and refinements without departing from the principle of this application, and the improvements and refinements shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs sentence translation and model training). In practical application, the foregoing functions may be allocated to and completed by different functional modules according to requirements, that is, an inner structure of a device is divided into different functional modules to implement all or a part of the functions described above.

What is claimed is:

1. A translation method, executed by an electronic device, comprising:
    obtaining a to-be-translated sentence;
    dividing the to-be-translated sentence into a preset quantity of clauses;
    separately translating each of the clauses to obtain a respective translation result corresponding to each of the clauses, wherein the steps dividing and separately translating are performed through a translation model executed on the electronic device, wherein an initial neural network model is trained by using a plurality of training samples until a loss function of the initial neural network model converges and the trained initial neural network model is used as the translation model; and
    combining the respective translation results corresponding to the clauses according to semantics to obtain a target translation sentence corresponding to the to-be-translated sentence.

2. The method according to claim 1, wherein sentence lengths corresponding to at least two of the clauses are different, the sentence length representing the quantity of words contained in a corresponding clause.

3. The method according to claim 2, further comprising:
    specifying, based on the preset quantity and a sentence length of the to-be-translated sentence, a sentence length of a first clause in the clauses that satisfies a first set ratio to a first length;
    specifying a sentence length of a second clause in the clauses that satisfies a second set ratio to a second length;
    wherein a sum of the first set ratio and the second set ratio is 1.

4. The method according to claim 1, wherein separately translating each of the clauses to obtain a respective translation result corresponding to each of the clauses comprises:
    for each of the clauses, obtaining, from a candidate translation word set, respective translation results corresponding to the clause.

5. The method according to claim 4, wherein the candidate translation word set comprises a translation end tag, and the method further comprises:
    determining, for a respective clause of the clauses, a sentence length corresponding to the clause by:
        determining, from the candidate word translation set, respective candidate translation words corresponding to the words in the respective clause; and
        determining, based on the determined candidate translation words and the translation end tag, the sentence length corresponding to the respective clause.

6. The method according to claim 4, wherein the candidate translation word set comprises a translation start tag and a translation end tag; and
    obtaining, from the candidate translation word set, the respective translation results corresponding to each of the clauses comprises for each of the clauses:
    determining from the candidate translation word set a candidate translation word corresponding to each to-be-translated word in the clause;
    translating the clause in accordance with a determination that the candidate translation word is the translation start tag; and
    continuing to translate the clause in accordance with a determination that the candidate translation word is neither the translation start tag nor the translation end tag; and
    in accordance with a determination that the candidate translation word is the translation end tag, ending the translating of the clause to obtain the translation result corresponding to the clause.

7. The method according to claim 1, wherein separately translating each of the clauses to obtain the respective translation results corresponding to each of the clauses comprises:
    separately translating each of the clauses to obtain respective preliminary translation results corresponding to each of the clauses; and
    in accordance with a determination that the preliminary translation results include one or more first results containing a translation error, performing error correction on the first results to obtain one or more corrected first results; and
    obtaining, based on the one or more corrected first results and the preliminary translation results that do not contain a translation error, the translation results corresponding to the clauses.

8. The method according to claim 7, wherein the translation error comprises at least one of a missing word or a repeatedly translated word, and the method further comprises:
    determining, for any clause, whether there is a translation error in the clause based on each word in the preliminary translation result corresponding to the clause.

9. The method according to claim 7, wherein the translation error comprises at least one of a missing word or a repeatedly translated word, and the method further comprises:
    determining, for any two adjacent clauses in the clauses, whether there is a translation error in the two adjacent clauses based on (1) the last word in the preliminary translation result corresponding to a first clause of the two adjacent clauses and (2) the first word in the preliminary translation result corresponding to a second clause of the two adjacent clauses.

10. The method according to claim 7, wherein performing the error correction on the preliminary translation result with the translation error comprises:
    translating the missing word.
11. The method according to claim 7, wherein:
    the translation error comprises a repeatedly translated word, and
    performing the error correction comprises deleting the repeatedly translated word from the preliminary translation result.
12. The method according to claim 11, wherein:
    the translation results corresponding to the clauses are determined from a candidate translation word set;
    the candidate translation word set comprises a deletion tag used for identifying a translation result of a corresponding clause as a repeatedly translated word; and
    deleting the repeatedly translated word from the preliminary translation result comprises deleting the repeatedly translated word corresponding to the deletion tag from the preliminary translation result.
13. The method according to claim 1, wherein each of the training samples comprising (1) a to-be-translated sample sentence and (2) a translated sample sentence corresponding to the to-be-translated sample sentence, wherein: the translated sample sentence includes sub-sample sentences obtained by dividing the translated sample sentence according to a sample clause quantity, each sub-sample sentence carrying a label that represents a translation labeling result of the to-be-translated sample sentence corresponding to the sub-sample sentence.
14. The method according to claim 13, wherein the training of the initial neural network model further comprises:
    determining, for a training sample of the plurality of training samples, sample lengths of the sub-sample sentences in the training sample, the determining including:
        determining, based on a discrete probability distribution, a sentence length of the translated sample sentence, the sample clause quantity, and a division manner, a selection probability corresponding to the division manner; and
        determining the sample lengths of the sub-sample sentences based on the selection probability corresponding to the division manner and the sentence length of the translated sample sentence.
15. The method according to claim 13, wherein the plurality of training samples comprise a first training sample having a first translated sample sentence that includes a repeated translated word, and the method further comprises determining the first translated sample sentence comprising the repeated translated word by:
    dividing the first translated sample sentence into a first quantity of clauses, the first quantity being less than the sample clause quantity:
    determining at least one of the first quantity of clauses as the repeatedly translated word; and
    inserting the repeatedly translated word into the translated sample sentence to obtain the translated sample sentence comprising the repeatedly translated word.
16. An electronic device, comprising:
    one or more processors; and
    memory storing one or more programs, the one or more programs comprising instructions that, when executed by the one or more processors, cause the one or more processors to perform operations comprising:
        obtaining a to-be-translated sentence;
        dividing the to-be-translated sentence into a preset quantity of clauses;
        separately translating each of the clauses to obtain a respective translation result corresponding to each of the clauses, wherein the steps dividing and separately translating are performed through a translation model executed on the electronic device, wherein an initial neural network model is trained by using a plurality of training samples until a loss function of the initial neural network model converges and the trained initial neural network model is used as the translation model; and
        combining the respective translation results corresponding to the clauses according to semantics to obtain a target translation sentence corresponding to the to-be-translated sentence.
17. The electronic device according to claim 16, wherein separately translating each of the clauses to obtain a respective translation result corresponding to each of the clauses comprises:
    for each of the clauses, obtaining, from a candidate translation word set, respective translation results corresponding to the clause.
18. The electronic device according to claim 17, wherein the candidate translation word set comprises a translation end tag, and the operations further comprise:
    determining, for a respective clause of the clauses, a sentence length corresponding to the clause by:
        determining, from the candidate word translation set, respective candidate translation words corresponding to the words in the respective clause; and
        determining, based on the determined candidate translation words and the translation end tag, the sentence length corresponding to the respective clause.
19. A non-transitory computer-readable storage medium, storing a computer program, the computer program, when executed by one or more processors of an electronic device, cause the one or more processors to perform operations comprising:
    obtaining a to-be-translated sentence;
    dividing the to-be-translated sentence into a preset quantity of clauses;
    separately translating each of the clauses to obtain a respective translation result corresponding to each of the clauses, wherein the steps dividing and separately translating are performed through a translation model executed on the electronic device, wherein an initial neural network model is trained by using a plurality of training samples until a loss function of the initial neural network model converges and the trained initial neural network model is used as the translation model; and
    combining the respective translation results corresponding to the clauses according to semantics to obtain a target translation sentence corresponding to the to-be-translated sentence.

* * * * *